Figure 1:
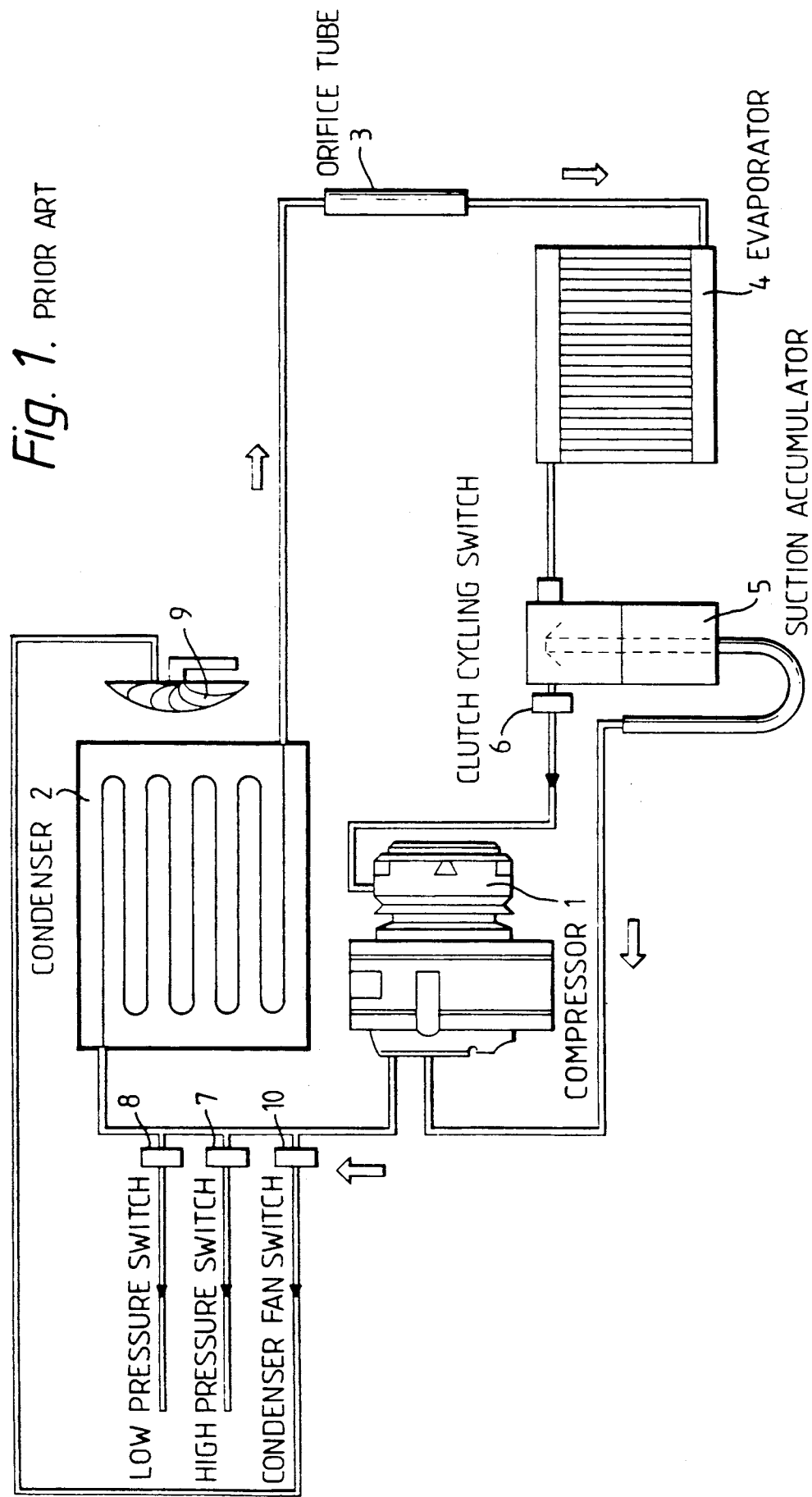

United States Patent [19]

Bromley et al.

[11] Patent Number: 5,072,597
[45] Date of Patent: Dec. 17, 1991

[54] CONTROL SYSTEMS FOR AUTOMOTIVE AIR CONDITIONING SYSTEMS

[75] Inventors: Patrick J. Bromley, Solihull; Grenville G. H. Luxton, Birmingham, both of United Kingdom

[73] Assignee: Motor Panels (Coventry) Ltd., Coventry, England

[21] Appl. No.: 508,703

[22] Filed: Apr. 13, 1990

[30] Foreign Application Priority Data

Apr. 13, 1989 [GB] United Kingdom ............... 8908338

[51] Int. Cl.⁵ ............................................. F25B 41/00
[52] U.S. Cl. ....................................... 62/209; 62/227; 62/323.4
[58] Field of Search .............. 62/209, 227, 229, 323.4, 62/323.1, 157, 133, 244, 243, 126, 176.1, 176.6, 181, 183, 184, 180; 236/49.3, 91 C, 91 E, 91 F, 44 R, 44 C; 165/16, 42, 43; 98/2.01

[56] References Cited

U.S. PATENT DOCUMENTS

| | | | |
|---|---|---|---|
| 2,705,404 | 4/1955 | Malutich | 62/181 X |
| 4,463,573 | 8/1984 | Zeno et al. | 62/157 |
| 4,463,576 | 8/1984 | Burnett et al. | 62/157 X |
| 4,481,784 | 11/1984 | Elmslie | 62/157 X |
| 4,667,480 | 5/1987 | Bessler | 62/180 |
| 4,848,444 | 7/1989 | Heinle et al. | 62/176.6 X |

Primary Examiner—Harry B. Tanner
Attorney, Agent, or Firm—Antonelli, Terry, Stout & Kraus

[57] ABSTRACT

A control system for an automotive air conditioning system includes temperature sensors at the evaporator and at the compressor of the air conditioning system and a controller responsive to signals from the sensors to control cycling of the compressor clutch. The controller is operative to monitor the cycle rate of the compressor clutch (i.e., the duration for which the clutch is engaged in any given cycle) and to provide command signals to control air conditioning system when the clutch cycle rate exceeds or falls below predetermined values. The controller is programmed so that at a predetermined level of sensed humidity in the vehicle to change the predetermined evaporator temperature values at which the clutch is engaged or disengaged so as to change the moisture content in the air flowing across the evaporator before it is supplied to the interior of the vehicle. The system includes humidity controller in the interior of the vehicle for sensing the relative humidity of the air within the vehicle, wherein the control means is also adapted to adjust the humidity of the conditioned air in response to signals from the humidity sensor.

15 Claims, 2 Drawing Sheets

CONTROL SYSTEMS FOR AUTOMOTIVE AIR CONDITIONING SYSTEMS

This invention relates to the control of automotive air conditioning systems and particularly to systems of the kind which include a refrigeration circuit having a compressor, a condenser, expansion means, an evaporator and an electromechanical clutch which controls operation of the compressor.

In such refrigeration systems the refrigerant gas is compressed to a high temperature, high pressure state by the compressor before passing into the condenser where the temperature of the gas is reduced by loss of heat to the air flowing across the condenser core to produce a high temperature liquid state. This liquid is then passed through the expansion means to decrease rapidly its pressure and temperature. The now cold low pressure liquid passes into the evaporator where heat from the air entering the vehicle is absorbed by the liquid thus boiling and reverting back to a cold low pressure gas. This gas is then drawn into the compressor by suction and the cycle is complete. The expansion means may comprise a thermostatic expansion valve or an orifice tube. The system may also include drying (desiccant) means in the form of a filter drier or a suction accumulator.

In all refrigeration systems as described above it is necessary to prevent excessive freezing on the evaporator core of moisture condensed from the delivery air. This is achieved in refrigeration systems which have a cycling clutch by sensing when the compressor has lowered the pressure of the evaporator to the point of condensate freezing and then disengaging the compressor clutch. When the temperature and pressure of the evaporator has increased to a predetermined level owing to the heat from the incoming air, the compressor drive is re-engaged by the clutch and the system continues to cycle in this manner.

Currently, automotive air conditioning systems use electromechanical pressure switches to provide control for compressor clutch cycling, for actuation of condenser cooling fans when provided, and for system cut out protection in the event of abnormally high and low operating pressures. Alternatively, control systems are known to sense the air temperature at the evaporator, e.g., by means of a dedicated thermistor or capillary tube monitor and relative control circuitry, for control of the compressor clutch engagement, but always in conjunction with pressure switches for system protection.

The first aspect of the invention aims to obviate the requirement for multiple pressure switches and provide system control and protection by means of comparing the electrical signals from two sensors. The information from these sensors are interpreted and acted upon by an electronic control module.

According to a first aspect of the invention there is provided a control system for an automotive air conditioning system which includes a refrigeration circuit which comprises a refrigerant compressor whose operation is controlled by an electromechanical clutch, a condensor, a refrigerant expansion means and an evaporator, the control system comprising means for sensing temperatures at the evaporator and at the compressor of the air conditioning system and a controller which is responsive to signals from the sensing means to control the cycle rate of the compressor clutch and to provide command signals for control of the air conditioning system when the clutch cycle rate exceeds or falls below predetermined values.

The "clutch cycle" rate is the duration for which the clutch is engaged in any given cycle.

The sensing means may comprise a temperature diode or an NTC type thermistor disposed immediately downstream of the evaporator core to sense the temperature of air flowing over the evaporator core surface. A second identical sensing means monitors the temperature of the compressor discharge hose.

Conveniently, the controller is implemented by means of an electronic control module which may include a suitably-programmed microprocessor and support circuitry (interfacing, RAM, ROM, etc). The controller may be programmed to provide command signals to various components of the air conditioning system for control and protection of the system.

The controller may be arranged to control whether fresh air or recirculated air is cooled by passing over the evaporator core surface of the air conditioning system.

Thus, one stage of system control may consist of the control module sending command signals to the electrical coil of a solenoid valve in series with the air selector valve which determines whether fresh air or recirculated air is cooled by passing over the evaporator core surface. The load on the refrigeration air is reduced in that a fixed quantity of air is cooled repetitively, but operation for too long in the recirculation mode can become uncomfortable for the occupants of the vehicle when stale air in the vehicle containing, for instance, odours or cigarette fumes, is recirculated. It is therefore desirable to provide a fairly rapid return to fresh air. In the present invention this may be achieved by programming the controller in such a manner that when the cycle rate of the compressor clutch exceeds a first predetermined value a command signal is sent to the air supply selector valve to select the recirculation mode, and when the cycle rate falls below a different slightly lower, predetermined value, a second command signal is sent to select the fresh air mode. By suitable selection of the predetermined threshold value or values for the compressor clutch cycle rate the system can be arranged to cycle between recirculated and fresh air for maximum comfort of the occupants.

Water cooled engines rely on either engine driven or electric cooling fans to dissipate heat from the radiator (and turbocharger intercooler if fitted) by increasing the ambient airflow across the cores. The condenser, normally mounted upstream of the radiator also benefits from this cooling air but in particular circumstances, e.g., on initial pull-down in high ambients with a cold engine, independent cooling to the condenser core is preferred. Such cooling can be provided, for example, by an electric fan mounted upstream of the condenser enabled by output signals from the electronic module to this condenser fan. The control module may therefore be programmed with a further predetermined threshold value or values for the cycle rate of the compressor clutch for controlling operation of the condenser cooling fan. The further threshold value or values will generally be higher than the predetermined value or values of the compressor clutch cycle rate set for operation of the air supply selector valve.

The control module may also be programmed to send a command signal to the air supply selector valve and/or to the condenser cooling fan when the compressor clutch remains engaged for a predetermined time when the vehicle engine is started from cold or when high ambient temperatures are sensed by the evaporator thermistor when the engine has completed its cranking/start cycle.

In another optional feature of the invention, the controller is operative to monitor the evaporator and condenser temperatures and the clutch engagement cycle rate and to shut down the air conditioning system when either the air conditioning system is under excessive load or when a component of the air conditioning system either fails or leaks resulting in abnormal monitored operating temperatures and cycle rates.

In addition to, or instead of, inferring the compressor load from the clutch cycle rate in carrying out the protective function just noted, the inferred load may also be used in the control strategy of the controller in normal operation to respond to prevailing cooling or dehumidifying demands.

A further advantage resulting from the elimination of pressure switches in the conventional system is that the refrigeration system can be adapted to use different refrigerants by reprogramming the electronic control module processor software and without replacing any of the system control components. This is likely to be increasingly important in the next few years since there is a trend away from the current use of chlorofluorocarbons (CFCs) as refrigerants owing to their harmful effects on the atmosphere. Less harmful refrigerants which are currently being developed are likely to have different operating pressures than in existing refrigerant systems which would require new pressure switch operating limits and/or material changes.

The air conditioning system in accordance with the first aspect of the invention may also be enhanced, by providing additional inputs to the electronic control module from sensors within and outside the vehicle, to enable the electronic control module to control automatically all aspects of the air conditioning system so as to provide a comfortable vehicle environment without requiring driver interaction and regardless of ambient conditions.

In such an enhanced system it is envisaged that the sensors will include temperature and humidity sensors within the vehicle and at least one temperature sensor outside the vehicle so that the control module of the system can automatically achieve and maintain a predetermined interior temperature and humidity and automatically defrost the windscreens when required.

Preferably the system controls the humidity of air delivered by the air conditioning system to the interior of the vehicle by the controller being programmed so that at a predetermined level of sensed humidity in the vehicle to change the predetermined evaporator temperature values at which the clutch is engaged or disengaged so as to change the moisture content in the air flowing across the evaporator before it is supplied to the interior of the vehicle.

A second aspect of the invention provides the combination of a control system according to the first aspect of the invention with an automotive air conditioning system.

Moreover, it is believed that the use of a direct reading humidity sensor in an automotive air conditioning system has not been proposed previously. Thus, a second aspect of the invention provides a combination of a control system according to the first aspect and an automotive air conditioning system which includes temperature sensing means for sensing the average temperature within the interior of the vehicle, control means for controlling the temperature of the conditioned air in response to signals from the temperature sensing means, and humidity sensing means in the interior of the vehicle for sensing the relative humidity of the air within the vehicle, wherein the control means is also adapted to adjust the humidity of the conditioned air in response to signals from the humidity sensing means.

The control of the humidity of the conditioned air may be achieved in any convenient manner. Conveniently, the clutch of the compressor is cycled by command signals from the controller in response to temperature signals from sensors at the evaporator and compressor, the controller being programmed so as, at a predetermined level of sensed humidity in the vehicle to change the predetermined evaporator temperature values at which the clutch is engaged or disengaged thereby to change the moisture content in the air flowing across the evaporator before it is supplied to the interior of the vehicle.

As will become apparent from the following detailed description, both aspects of the invention may be embodied in the same system.

Figure 2:
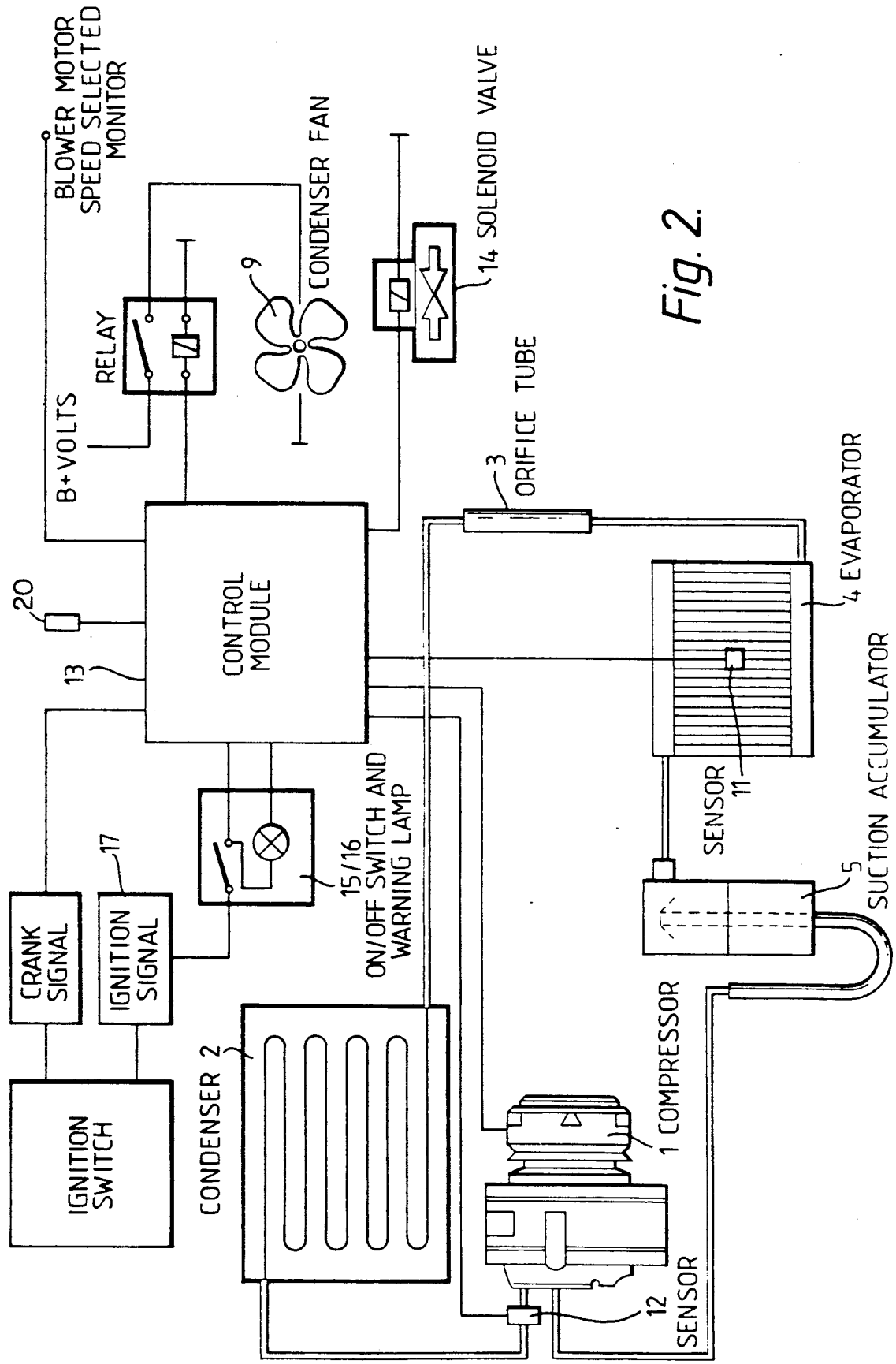

The present invention will be further described, by way of example only, with reference to the accompanying drawings in which:

FIG. 1 is a diagram of a refrigeration system of a known automotive air conditioning system; and FIG. 2 is a diagram of an automotive air conditioning system in accordance with the first aspect of the invention.

FIG. 1 shows a standard pressure switch controlled cycling clutch-orifice tube (CCOT) refrigeration system. The system comprises a constant displacement compressor 1, a condenser 2, expansion means in the form of an orifice tube 3, an evaporator 4 and drying means in the form of a suction accumulator 5.

In operation the clutch of the compressor 1 is engaged to drive the compressor causing refrigerant in the system to circulate in the direction indicated by the arrows. A clutch cycling switch 6 senses when the pressure of the evaporator 4 has been lowered to the point of condensate freezing and disengages the clutch of the compressor 1. The temperature and pressure of the evaporator 4 then increases owing to the heat of the incoming air and the clutch cycling switch 6 senses when the pressure has reached a predetermined level and re-engages the compressor clutch. The temperature and pressure of the evaporator 4 then falls again until the condenser clutch is disengaged again at the point of condensate freezing and the system continues to cycle in this manner.

In addition to the clutch cycling switch 6, other pressure switches are provided for protection of the system. A high pressure switch 7 is provided which shuts down the system when excessive pressure in the refrigeration system is detected, and a low pressure switch 8 detects when part of the system leaks. When a condenser fan 9 is provided, its operation may be controlled by a pressure switch 10 which switches on the fan at a predetermined pressure below the maximum pressure permitted by the high pressure switch 7.

FIG. 2 shows a basic air conditioning system in accordance with the invention. Essentially it comprises a cycling clutch-orifice tube (CCOT) refrigeration system similar to that of FIG. 1 but in which the pressure switches and clutch cycling switch have been replaced by two temperature sensors 11/12 and an electronic control module 13.

The temperature sensor 11 preferably comprises a thermistor and is mounted between immediately downstream of the evaporator core so as to sense the temperature of the air flowing across the evaporator core. The temperature sensor 12 preferably comprises an identical thermistor to 11, but mounted on the discharge pipe of the compressor. The control module 13 preferably comprises a microprocessor based unit which controls not only the cycling of the clutch of the compressor in response to temperature signals from thermistors 11 and 12 but additionally monitors the cycle rate of the compressor clutch and controls other components of the system in response to the cycle rate.

The control module 13 controls operation of an air supply selector valve 14 which determines whether fresh air or recirculated air is used in the air conditioning system, operation of the condenser cooling fan 9 (when provided), and operation of the warning and shutdown system which is actuated when the system is under excessive load or when part of the system fails. Preferably, the instrumentation of the automotive vehicle in which the system is installed includes an on/off switch 15 for the system and warning means, e.g., in the form of a warning light 16 which indicates when the system is out of operation.

During normal operation of the system the on/off switch supplies a signal to the control module processor which then supplies an output to the compressor clutch via a power transistor if predetermined conditions are met, i.e., the clutch is engaged if a signal is received from the vehicle ignition 17 indicating that the engine is not cranking, if the ambient temperature is above $-1°$ C. (30° F.), and if a blower fan speed has been selected. The compressor clutch is then cycled by the microprocessor of the control module which monitors the thermistor temperature and disengages the clutch when the temperature falls to the lower threshold value, say $-1°$ C. (30° F.) and engages the clutch at a higher predetermined threshold value, say 9° C. (48° F.). These threshold temperatures can be adjusted in the software of the microprocessor to suit individual vehicles and system performance.

The control module also monitors the cycle rate of the compressor clutch by comparing the duration of clutch engagement (Ti) to the duration of clutch disengagement (To). By comparing this cycle rate to predetermined limits the control module will perform the following three functions:

A) Operation of the air supply selector valve.

The operation of the air supply selector valve, allowing ambient or recirculated air to flow to the blower, can be controlled by two means. For this enhanced system (AVEC) an electric actuator assembly would be demanded which would comprise of either a low current DC motor, a reduction gearbox and a potentiometer assembly or stepper motor. For the DC motor application, the control module compares the voltage variation of the resistive potentiometer track against a constant reference voltage so that the accurate position of the motor output spindle, and hence the air valve, can be established. The control module can be programmed with the limits of movement of any given air valve application to prevent excessive movement.

For an initial form of the system (designated ERM) the supply valve would be operated by a vacuum or high pressure servo actuator. A solenoid valve located in the vacuum/high pressure air supply line may be used to interrupt the vacuum/high pressure supply thus selecting fresh or recirculated air. In most cases, a manual override of this function would be provided.

When the engine is switched off the control module drives the actuator to the recirculation position.

The use of electromechanical pressure switches in prior air conditioning systems provides only for fixed points of engagement and disengagement of component items (compressor clutch, condenser cooling fan and system protection). The control method described provides for the ERM to modify the control characteristics in varying ambients, whereby, on initial engagement of the ERM module the evaporator thermistor will measure an approximation of the ambient temperature, and the ERM will thus pre-select one of two sub-routines relating to thermistor set points and compressor cycle characteristics.

The ability of the ERM to operate the air conditioning system differently in either low to moderate ambients (less than or equal to 20° C.), or high ambients (greater than 20° C.) relating to compressor clutch operation, condensor fan operation and recirculation door operation ensures that the air conditioning system will always function in its optimum manner.

For an enhanced form of the system (designated AVEC), when the vehicle engine is started in either heater or air conditioning mode the control module drives the actuator to the 100% fresh air position and the control module receives a voltage feedback from the actuator to confirm its correct position is achieved. The actuator will stay in this fresh air position until either the engine is switched off and it returns to a body vent position or the air conditioning mode is selected and the control module detects that the system is under load.

The determination of the system load is achieved by the control module by comparing Ti to To, ie, by evaluating the cycle rate of the compressor clutch. When Ti exceeds a predetermined percentage (e.g., 65%) of the duration of one cycle or when Ti exceeds a first predetermined time (e.g., 30 seconds) on initial start up then the actuator is driven to the "recirc" position in which only a small percentage (e.g., 10%) of fresh air is drawn into the system. Once Ti reduces to a lower predetermined percentage (e.g., 60%) of the duration of one cycle then the actuator is driven to the "fresh air" position.

Hence:

Initial start up (pulldown)
Ti = 30 seconds - "recirc"

Normal running $$\frac{Ti}{Ti + To} \times 100\% \text{ greater than } 65\% - \text{"recirc"}$$

$$\frac{Ti}{Ti + To} \times 100\% \text{ less than } 60\% - \text{"fresh air"}$$

B) Operation of the condenser cooling fan.

When a condenser cooling fan is provided in the system the control module can be arranged to control its operation by a similar principle to that used in controlling the air supply selector valve but at a higher system loading. In this case the control module is arranged to turn the condenser cooling fan on when Ti exceeds a second predetermined time (e.g., two minutes) on initial start up or when Ti exceeds a predetermined high threshold percentage (e.g., 90%) of the duration of one cycle. When Ti falls below a lower predetermined threshold percentage (e.g., 80%) of the duration of one cycle the condenser cooling fan is turned off.

In addition when either a high compressor discharge temperature (90° C.) or the evaporator thermistor senses a high ambient temperature (30° C.) during the engine crank cycle the condenser fans are engaged and will disengage when the cycle rates are satisfactory.

Hence:

Initial start up (pulldown)
$Ti$ = 2 minutes - fan on

Normal running $\frac{Ti}{Ti - To} \times 100\%$ greater than 90% - fan on $\frac{Ti}{Ti - To} \times 100\%$ less than 80% - fan off It is to be appreciated that the threshold values of the cycle rate (Ti) given above are nominal values and may be varied for different systems. However, when the control module is arranged to control both the air supply inlet valve and the condenser cooling fan, it is generally envisaged that the threshold values for controlling the condenser fan will be higher than those used to control the air supply valve.

The condenser cooling fan control circuit may also be wired in parallel with a temperature sensor in the radiator to provide additional cooling when the engine coolant is in danger of boiling.

C) System protection.

By monitoring the two thermistor temperature and the clutch engagement rate the control module will detect when the system is under excessive load (high pressure) or when a component seal, drive belt or hose fails releasing the refrigerant gas (low pressure).

In both cases the compressor engagement will not have the normal impact of reducing the temperature of the evaporator core (and would in fact produce a rise in temperature due to the heat from the oncoming air) and an increase in the compressor discharge temperature. The control module can then establish the exact criteria for the system to be shut down.

When the control module identifies a fault the output to the compressor clutch is removed thus switching the air conditioning system off (preventing further damage to the components therein) and a control module output warns the driver of the fault by flashing a warning light integral to the vehicle instrumentation. The driver can switch off the flashing warning light by switching the air conditioning demand switch off. A note in the drivers hand book will desirably be provided to inform the driver to check the components for failure (i.e., burst pipe, broken drive belt) and have the vehicle repaired. If the condenser airflow was reduced causing high pressure to be indicated for example by debris blocking the fins, then this debris could be removed and the air conditioning system would be operational again.

If the air conditioning is switched on following a shut-down the control module will perform the diagnostic check again, and if the fault is still present will go into shut down mode again.

The air conditioning system shown in FIG. 2 may also be enhanced to provide an automatic vehicle environment control (AVEC) system by the addition of vehicle sensors and actuators for the air conditioning unit of the vehicle and by programming an expanded function electronic control module to perform additional operations to be described below.

In the enhanced air conditioning system the vehicle sensors preferably include at least one external temperature sensor for sensing the ambient temperature outside the vehicle, at least two internal temperature sensors located inside the vehicle (preferably in the front and rear passenger areas) which enable the mean interior temperature to be calculated, a heater water inlet temperature sensor for sensing the water inlet temperature received by the heater matrix, an air temperature sensor for sensing the temperature of the conditioned air to be supplied to the interior of the vehicle and a humidity sensor 20 for sensing the relative humidity of the air within the vehicle.

As in the basic system described with reference to FIG. 2, the electronic control module of the AVEC system is programmed to control the cycling of the compressor clutch in response to signals from thermistors mounted at the evaporator core and at the compressor discharge hose to provide system protection by monitoring the clutch cycle rate and compressor discharge temperature. The control module of the AVEC system is also provided with additional inputs for receiving signals from the vehicle sensors and is programmed to control automatically the temperature and distribution of the conditioned air supply and the blower of the air conditioning unit in response to those signals by means of at least three electric actuators.

The AVEC control module may, for instance, be programmed to adjust automatically the temperature, distribution and blower speed settings to attain an interior vehicle environment of 23° C. and 50% relative humidity in the shortest possible time unless the vehicle sensors detect that it is necessary to defrost the windscreen in which case the control module will automatically select the defrost mode and cause heated air to be directed onto the windscreen at a high blower speed prior to resuming the control programme.

In the AVEC system it is possible for the humidity of the air to be supplied to the interior of the vehicle to be changed by altering the predetermined temperatures used to cycle the compressor clutch of the evaporator core. The AVEC module normally cycles the compressor clutch between predetermined evaporator core thermistor temperatures of approximately −1° C. and 9° C. However, when the humidity in the vehicle falls to an unacceptable level, e.g., 35% RH, the predetermined temperatures are raised to approximately 4° C. and 14° C. to increase the water content of the air from the evaporator core until an acceptable level of interior humidity is reached.

By monitoring the internal and external environment, the AVEC system will achieve and maintain the ideal interior environment regardless of external changes. Moreover, the heater/air conditioning unit may be split to provide side-to-side and/or front-to-rear temperature control in the vehicle using additional actuators to provide a bias.

In the AVEC system a driver operated control panel is preferably supplied to perform two functions:
    i) to provide indicators which visually demonstrate vehicle conditions and, ii) to provide a manual override of all pre-set functions.

When required the control panel can be partially or fully duplicated for rear passenger use.

Functions can be supplied to individual requirements, but it is suggested that the panel contain the following:
a) external temperature display incorporating ice warning
b) internal set temperature display
c) distribution display
d) ° C./° F. select
e) panic defrost select
f) blower speed select
g) recirculated air select
h) automatic/manual/economy mode select
i) temperature set select
j) distribution select As all relevant actuator motion and load distribution decisions/executions for high power components are controlled within the AVEC control module, the displays and selections etc merely provide a signal to the internal circuitry. It is therefore feasible to utilise membrane or touch screen technology to provide operator control.

We claim:

1. A control system for an automotive air conditioning system which includes a refrigeration circuit comprising a refrigerant compressor, an electromechanical clutch for controlling an operation of the compressor, a condensor, a refrigerant expansion means and an evaporator having an evaporator core surface, the control system comprising means for sensing temperatures at the evaporator and at the compressor of the air conditioning system and a controller responsive to signals from the sensing means to control cycling of the compressor clutch, wherein the controller is operative to monitor the cycle rate of the compressor clutch and to provide command signals, to control the operation of the air conditioning system in providing conditioned air, when the clutch cycle rate exceeds or falls below predetermined values.

2. A control system according to claim 1, wherein the controller is arranged to control whether fresh air or recirculated air is cooled by passing over the evaporator core surface of the air conditioning system.

3. A control system according to claim 2, wherein the controller is programmed such that when the cycle rate of the compressor clutch exceeds a first predetermined value it produces a command signal to select air recirculation mode, and when the cycle rate falls below the second predetermined value, it produces a second command signal to select the fresh air mode.

4. A control system according to claim 1, in which the controller is operative to use, in a normal operation of the air conditioning system to satisfy a cooling or dehumidify demand, as an indication of a current operating load on the refrigerant compressor.

5. A control system according to claim 1, wherein the controller is operative to monitor the evaporator and condenser temperatures and the clutch engagement cycle rate and to shut down the air conditioning system when either the air conditioning system is under excessive load or when a component of the air conditioning system either fails or leaks resulting in abnormal monitored operating temperatures and cycle rates.

6. A control system according to claim 1, and including means for sensing humidity of air in the vehicle, wherein the controller is programmed so that at a predetermined level of a sensed humidity in the vehicle to change the predetermined evaporator temperature values at which the clutch is engaged or disengaged so as to change moisture content in the air flowing across the evaporator before the air is supplied to an interior of the vehicle.

7. In combination:
an automotive air conditioning system comprising a refrigeration circuit which comprises a refrigerant compressor, an electromechanical clutch for controlling the operation of the compressor, a condensor, a refrigerant expansion means and an evaporator having an evaporator core surface;
and a control system comprising means for sensing temperatures at the evaporator and at the compressor of the air conditioning system and a controller responsive to signals from the sensing means to control cycling of the compressor clutch, wherein the controller is operative to monitor the cycle rate of the compressor clutch and to provide command signals, to control the operation of the air conditioning system in providing conditioned air, when the clutch cycle rate exceeds or falls below predetermined values.

8. A combination according to claim 7 and comprising a temperature sensor disposed immediately downstream of the evaporator core to sense the temperature of air flowing over the evaporator core surface and a temperature sensor disposed to monitor the temperature of the compressor discharge hose.

9. A combination according to claim 7 and including an electric fan mounted upstream of the air conditioning system condenser and controlled by output signals from the controller.

10. A combination according to claim 9, wherein the controller is programmed with a further predetermined threshold value or values for the cycle rate of the compressor clutch for controlling operation of the condenser cooling fan.

11. A combination according to claim 9, wherein the air conditioning system comprises an air supply selector valve and the controller is programmed to send a command signal to at least one of the air supply selector valve and the condenser cooling fan when the compressor clutch remains engaged for a predetermined time when the vehicle engine is started from cold or when high ambient temperatures are sensed by the evaporator temperature sensor when the engine has completed its cranking/start cycle.

12. A combination according to claim 7, and including at least one of additional temperature sensors and humidity sensors to be disposed within and outside the vehicle, and connected to the controller.

13. A combination according to claim 12, wherein the additional sensors include temperature and humidity sensors disposed within the vehicle and at least one temperature sensor disposed outside the vehicle, and wherein the controller is programmed to automatically achieve and maintain a predetermined interior temperature and humidity and to automatically defrost windscreens of the vehicle when instructed by an operator.

14. A combination according to claim 7, and including temperature sensing means for sensing the average temperature within the interior of the vehicle, and the controller is operative to control the temperature of the conditioned air in response to signals from the temperature sensing means, and humidity sensing means in the interior of the vehicle for sensing the relative humidity of the air within the vehicle, wherein the control means is also adapted to adjust the humidity of the conditioned air in response to signals from the humidity sensing means.

15. A combination according to claim 14, wherein the clutch of the compressor is cycled by command signals from the controller in response to temperature signals from sensors at the evaporator and compressor, the controller being programmed so as, at a predetermined level of sensed humidity in the vehicle to change the predetermined evaporator temperature values at which the clutch is engaged or disengaged thereby to change the moisture content in the air flowing across the evaporator before it is supplied to the interior of the vehicle.

* * * * *